United States Patent [19]

Flaningam et al.

[11] Patent Number: 5,456,856
[45] Date of Patent: Oct. 10, 1995

[54] AZEOTROPE AND AZEOTROPE-LIKE COMPOSITIONS OF OCTAMETHYLTRISILOXANE

[75] Inventors: Ora L. Flaningam; John A. Moore; Dwight E. Williams, all of Midland, Mich.

[73] Assignee: Dow Corning Corporation, Midland, Mich.

[21] Appl. No.: 374,316

[22] Filed: Jan. 18, 1995

[51] Int. Cl.$^6$ ............................. C11D 7/26; C11D 7/50; B08B 3/08; H05K 3/26

[52] U.S. Cl. ............................. 252/174.15; 134/38; 134/39; 134/40; 252/162; 252/170; 252/171; 252/DIG. 9

[58] Field of Search ............................. 252/162, 170, 252/171, 174.15, DIG. 9; 134/38, 39, 40

[56] References Cited

U.S. PATENT DOCUMENTS

| | | | |
|---|---|---|---|
| 4,155,865 | 5/1979 | Ostrozynski | 252/67 |
| 4,157,976 | 6/1979 | Ostrozynski | 252/67 |
| 4,324,595 | 4/1982 | Kaspizak | 134/38 |
| 4,370,204 | 1/1983 | Kotzsch | 203/39 |
| 4,954,335 | 9/1990 | Janchipraponvej | 424/70 |
| 5,286,476 | 2/1994 | Nanba et al. | 424/47 |
| 5,316,692 | 5/1994 | John | 252/174.15 |

FOREIGN PATENT DOCUMENTS

| | | |
|---|---|---|
| 473795 | 3/1992 | European Pat. Off. . |
| 6093294 | 4/1994 | Japan . |
| 6136388 | 5/1994 | Japan . |
| 6136389 | 5/1994 | Japan . |
| 6200294 | 7/1994 | Japan . |
| 6202051 | 7/1994 | Japan . |
| 6-292868 | 10/1994 | Japan . |
| 6-306392 | 11/1994 | Japan . |
| 6-313196 | 11/1994 | Japan . |
| WO93/14184 | 7/1993 | WIPO . |

OTHER PUBLICATIONS

Killgore et al, Journal of Chemical and Engineering Data, vol. 11 No. 4, pp. 535–537, 1966.
Guzman, Diss., Abstr. Intl. B, vol. 34 No. 5, pp. 2000B–2001B, 1973.
Radecki et al, Journal of Chemical and Engineering Data, vol. 20 No. 4, pp. 378–381, 1975.
Radecki et al, Inz. Chem., vol. 5 No. 4, p. 861+, 1975, No Month Available English Abstract only.
Radecki et al, Journal of Chemical and Engineering Data, vol. 23 No. 2, pp. 148–150, 1978 No Month Available.
Radecki et al, Journal of Chemical and Engineering Data, vol. 25 No. 3, pp. 230–232, 1980 No Month Available.
Guzman et al, Fluid Phase Equilibria, No. 7, pp. 187–195, 1981 No Month Available.
Kaczmarek et al, Pol. J. Chem. 61 (1–3), pp. 267–271, 1987 No Month Available.
Dickinson et al "Thermodynamics of n–Alkane & Dimethylsiloxane Mixtures Part 3–Excess Volumes" *J. Chem. Soc. Faraday Tarns. I* vol. 70 (12) 1974 No Month Available pp. 2328–2337.

*Primary Examiner*—Linda Skaling Therkorn
*Attorney, Agent, or Firm*—James L. DeCesare

[57] ABSTRACT

New binary azeotropes and azeotrope-like compositions are mixtures containing octamethyltrisiloxane and 2-butoxyethanol, 2-methylcyclohexanol, or isopropyl lactate. The mixtures are useful as environmentally friendly cleaning, rinsing, and drying agents.

7 Claims, No Drawings

AZEOTROPE AND AZEOTROPE-LIKE COMPOSITIONS OF OCTAMETHYLTRISILOXANE

RELATED AND COMMONLY ASSIGNED US APPLICATIONS

In Ser. No. 08/260,423, filed Jun. 15, 1994, we describe azeotropes of hexamethyldisiloxane (MM) with alcohols 3-methyl-3-pentanol, 2-pentanol, or 1-methoxy-2-propanol. A second application Ser. No. 08/289,360, filed Aug. 11, 1994, describes azeotropes of octamethyltrisiloxane with alcohols 2-methyl-l-pentanol; 1-hexanol; or 1-butoxy-2-propanol; and the ester ethyl lactate. A third application Ser. No. 08/306,293, filed Sep. 15, 1994, describes azeotropes of octamethyltrisiloxane and n-propoxypropanol. A fourth application Ser. No. 08/322,643, filed Oct. 13, 1994, describes methods of cleaning or dewatering surfaces with an azeotrope as rinsing agent.

BACKGROUND OF THE INVENTION

This invention is directed to environmentally friendly solvents, and more particularly to cleaning, rinsing, and drying agents which are binary azeotropes or azeotrope-like compositions containing a volatile methyl siloxane (VMS).

Because state, federal, and international regulations are aimed at restricting the use of certain chemicals, the search for suitable replacements is a dilemma faced by domestic and foreign chemical and industrial sectors. Replacement of "outlawed" chemicals with volatile methyl siloxanes as solvent is a viable approach in America, because the Environmental Protection Agency (EPA) has determined that octamethylcyclotetrasiloxane, decamethylcyclopentasiloxane, dodecamethylcyclohexasiloxane, hexamethyldisiloxane, octamethyltrisiloxane, and decamethyltetrasiloxane, are acceptable substitutes for chlorofluorocarbon $C_2Cl_3F_3$ (CFC-113) and methylchloroform (MCF). This determination is limited to cleaning in closed systems in metal, electronics, and precision cleaning applications under EPA's Significant New Alternatives Policy (SNAP).

The EPA also exempted VMS as a volatile organic compound (VOC). VMS is in the list of compounds in 40 CFR 51.100(s) excluded from the definition of VOC on the basis that VMS compounds have negligible contribution to tropospheric ozone formation. Compounds in that list have negligible photochemical reactivity. The EPA noted that exempting VMS from regulation as ozone precursors could contribute to the achievement of several important environmental goals, in that VMS might be used as a substitute for several compounds that are listed as hazardous air pollutants (HAP). The EPA explained that this met the need to develop substitutes for ozone depleting substances (ODS); and that it would attain national ambient air quality standards for ozone under Title I of the Clean Air Act and the Federal implementation plan for Chicago's ozone non-attainment area. The designation VMS under the EPA exemption covers cyclic, branched, and linear "completely methylated" siloxanes, and means that methyl groups and no other functional groups are attached to the central backbone of the siloxane.

Volatile methyl siloxanes have an atmospheric lifetime of 10–30 days and do not contribute significantly to global warming. Volatile methyl siloxanes have no potential to deplete stratospheric ozone due to short atmospheric lifetimes so they do not rise and accumulate in the stratosphere. VMS contain no chlorine or bromine atoms; do not attack the ozone layer; do not contribute to tropospheric ozone formation (Smog); and have minimum GLOBAL WARMING potential. VMS are hence unique in simultaneously possessing these attributes.

It should therefore be apparent that VMS provide one positive solution to the problem of substituting new materials for "outlawed" chemicals as cleaning agents.

SUMMARY OF THE INVENTION

The invention relates to new binary azeotropes containing a volatile methyl siloxane and an alcohol or ester. Certain azeotrope-like compositions were also discovered. The new VMS containing azeotropes and azeotrope-like compositions have utility as environmentally friendly cleaning, rinsing, and drying agents.

As cleaning agents, the azeotropes can be used to remove contaminants from any surface, but especially applications related to defluxing and precision cleaning, low-pressure vapor degreasing, and vapor phase cleaning. Some unexpected advantages and benefits of these VMS containing azeotropes as cleaning agents include their enhanced solvency power, and maintenance of a constant solvency power following evaporation, which can occur during applications involving vapor phase cleaning, distillative regeneration, and wipe cleaning.

Because the cleaning agent is an azeotrope, it has the added advantage of being more easily recovered and recirculated. Thus, an azeotrope can be separated from a contaminated cleaning bath effluent after its use in the cleaning process. By simple distillation, its regeneration is facilitated and it can be recirculated in the system as fresh cleaning agent.

In addition, these VMS azeotropes provide an unexpected advantage in being higher in siloxane fluid content and correspondingly lower in alcohol content, than azeotropes of siloxane fluids and low molecular weight alcohols such as ethanol. The surprising result is that the azeotropes are less inclined to generate tropospheric ozone and smog. Another surprising result in using these azeotropes is that they possess an enhanced solvency power compared to the VMS alone. Yet, the new azeotropes exhibit a mild solvency power making them useful for cleaning delicate surfaces without doing harm to the surface being cleaned.

These and other features, objects, and advantages of the invention will become more apparent from a consideration of the detailed description.

DETAILED DESCRIPTION OF THE INVENTION

An azeotrope is a mixture of two or more liquids, the composition of which does not change upon distillation. For example, a mixture of 95% ethanol and 5% water boils at a lower temperature (78.15° C.) than pure ethanol which boils at 78.3° C. or pure water which boils at 100° C. Such liquid mixtures behave like a single substance in that the vapor produced by partial evaporation of liquid has the same composition as the liquid. Thus, these mixtures distill at a constant temperature without change in their composition and cannot be separated by normal distillation.

Azeotropes can exist in systems containing two liquids (A and B) as binary azeotropes, three liquids (A, B, and C) as ternary azeotropes, and four liquids (A, B, C, and D) as quaternary azeotropes. The azeotropes of the invention are binary azeotropes. Azeotropism is an "unpredictable phenomenon" and each azeotropic composition must be discovered. The phenomenon of "unpredictability" is well documented in the prior art in U.S. Pat. Nos. 4,157,976 and 4,155,865.

For purposes of the invention, a mixture of two or more components is azeotropic if it vaporizes with no change in the composition of the vapor from the liquid. Specifically, azeotropic mixtures include both mixtures that boil without changing composition, and mixtures that evaporate at a temperature below the boiling point without changing composition. Accordingly, an azeotropic mixture may include mixtures of two components over a range of proportions where each specific proportion of the two components is azeotropic at a certain temperature but not necessarily at other temperatures.

Azeotropes vaporize with no change in their composition. If the applied pressure is above the vapor pressure of the azeotrope, the azeotrope evaporates without change. If the applied pressure is below the vapor pressure of the azeotrope, the azeotrope boils or distills without change. The vapor pressure of low boiling azeotropes is higher and the boiling point is lower than that of the individual components. In fact, the azeotropic composition has the lowest boiling point of any composition of its components. Thus, the azeotrope can be obtained by distillation of a mixture whose composition initially departs from that of the azeotrope.

Since only certain combinations of components can form azeotropes, the formation of an azeotrope cannot be reliably predicted without experimental vapor-liquid-equilibria (VLE) data, that is vapor and liquid compositions at constant total pressure or temperature for various mixtures of the components.

The composition of some azeotropes is invariant to temperature but in many cases, however, the azeotropic composition shifts with temperature. The azeotropic composition as a function of temperature can be determined from high quality VLE data at a given temperature. Commercial software is available to make such determinations such as the ASPENPLUS® program of Aspen Technology, Inc., in Cambridge, Mass. Given experimental data, such programs can calculate parameters from which complete tables of composition and vapor pressure may be generated. This allows a user of the system to determine where an azeotropic composition is located.

The azeotropes of this invention contain octamethyltrisiloxane which has the formula $(CH_3)_3SiO(CH_3)_2SiOSi(CH_3)_3$. It has a viscosity of 1.0 centistoke ($mm^2/s$) measured at 25° C. It is often referred to as "MDM" referring to its molecule which contains one difunctional "D" unit $(CH_3)_2SiO_{2/2}$ and two monofunctional "M" units $(CH_3)_3 SiO_{1/2}$ as shown below.

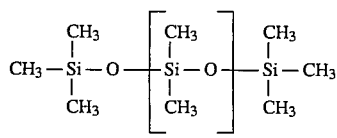

MDM is a clear fluid, essentially odorless, nontoxic, nongreasy, nonstinging, and nonirritating to skin. It leaves no residue after thirty minutes at room temperature when one gram of the fluid is placed at the center of No. 1 circular filter paper (diameter of 185 mm and supported at its perimeter in open room atmosphere).

The azeotropes of this invention also contain an alcohol or an alcohol ester. One alcohol is an alkoxy containing aliphatic alcohol with the Chemical Abstract Index name 1-butoxy-2-ethanol referred to hereafter as 2-butoxyethanol. It has the formula $C_4H_9OCH_2CH_2OH$ and the chemical name ethylene glycol n-butyl ether. 2-butoxyethanol is sold by The Dow Chemical Company, Midland, Mich., under their trademark DOWANOL® EB. The other alcohol is an alicyclic alcohol (c,t-)2-methylcyclohexanol referred to hereafter as 2-methylcyclohexanol. It has the formula $CH_3C_6H_{10}OH$ and is a mixture of "cis" and "trans" isomers. The alcohol ester is an alkyl ester of lactic acid, isopropyl lactate. It has the formula $CH_3CH(OH) CO_2CH(CH_3)_2$. Boiling points of these liquids in °C. measured at standard barometric pressure (101.3 kPa/760 millimeters of mercury) are 152.6° for MDM; 171° for 2-butoxyethanol; 164° for 2-methylcyclohexanol; and 166°–168° for isopropyl lactate.

New binary azeotropes of octamethyltrisiloxane were discovered containing (i) 4–18% by weight 2-butoxyethanol and 82–96% by weight octamethyltrisiloxane; (ii) 3–18% by weight 2-methylcyclohexanol and 82–97% by weight octamethyltrisiloxane; and (iii) 14–39% by weight isopropyl lactate and 61–86% by weight octamethyltrisiloxane. The azeotropes were homogeneous and had a single liquid phase at the azeotropic temperature and at room temperature. Homogeneous azeotropes are more desirable than heterogeneous azeotropes especially for cleaning applications, because homogeneous azeotropes exist as one liquid phase instead of two phases. In contrast, each phase of a heterogeneous azeotrope differs in its cleaning power. Therefore the cleaning performance of a heterogeneous azeotrope is difficult to reproduce because it is dependent upon consistent mixing of the phases. Single phase (homogeneous) azeotropes are more useful than multi-phase (heterogeneous) azeotropes since they can be transferred between locations with more facility.

Each homogeneous azeotrope was found to exist over a particular temperature range. Within that range the azeotropic composition shifted somewhat with temperature. Compositions containing the two alcohols were azeotropic within the range of 75°–160° C. inclusive. Compositions containing the ester were azeotropic within the range of 0°–153.1° C. inclusive. The following example illustrates the invention in more detail.

EXAMPLE I

A single-plate distillation apparatus for measuring vapor-liquid equilibria was used. The liquid mixture was boiled and the vapor was condensed into a small receiver. The receiver had an overflow path for recirculation to the boiling liquid. When equilibrium was established samples of the boiling liquid and the condensed vapor were separately removed and quantitatively analyzed by gas chromatography (GC). The temperature, ambient pressure, and the liquid and vapor compositions, were measured at several different initial composition points. This data was used to determine if an azeotropic composition existed. The azeotropic composition at different temperatures was determined by using the data with an ASPENPLUS® software program which performed the quantitative determinations. The new azeotropic compositions are shown in Tables I–III. In the tables, "MDM" designates weight percent in the azeotrope of octamethyltrisiloxane. Vapor pressure (VP) is shown in Torr pressure units (1 Torr=0.133 kPa/1 mm Hg). The accuracy in determining these azeotropes is plus or minus two weight percent.

TABLE I

| ALCOHOL | TEMPERATURE °C. | VP (Torr) | WEIGHT % MDM |
| --- | --- | --- | --- |
| 2-butoxyethanol | 160 | 1000 | 82 |
| | 149.9 | 760 | 84 |
| | 125 | 360.2 | 88 |
| | 100 | 151.6 | 93 |
| | 75 | 55.1 | 96 |

TABLE II

| ALCOHOL | TEMPERATURE °C. | VP (Torr) | WEIGHT % MDM |
| --- | --- | --- | --- |
| 2-methyl-cyclohexanol | 160 | 1000 | 82 |
| | 150.2 | 760 | 84 |
| | 125 | 357.8 | 89 |
| | 100 | 151 | 93 |
| | 75 | 55 | 97 |

TABLE III

| ESTER | TEMPERATURE °C. | VP (Torr) | WEIGHT % MDM |
| --- | --- | --- | --- |
| isopropyl lactate | 153.1 | 1000 | 61 |
| | 143.3 | 760 | 62 |
| | 125 | 434.3 | 63 |
| | 100 | 181.1 | 66 |
| | 75 | 64.4 | 70 |
| | 50 | 18.7 | 74 |
| | 25 | 4.2 | 79 |
| | 0 | 0.68 | 86 |

Azeotrope-like or pseudo-azeotropic compositions were also discovered containing octamethyltrisiloxane, 2-butoxyethanol, 2-methylcyclohexanol, and isopropyl lactate. For purposes of the invention, azeotrope-like or pseudo-azeotropic is intended to mean a composition that behaves like an azeotrope. Thus, azeotrope-like compositions have constant boiling characteristics, or have a tendency not to fractionate upon boiling or evaporation. In an azeotrope-like composition, the composition of the vapor formed during boiling or evaporation is identical or substantially identical to the composition of the original liquid. During boiling or evaporation, the liquid composition changes only minimally or to a negligible extent if it changes at all. In other words, it has about the same composition in vapor phase as in liquid phase when employed at reflux. In contrast, the liquid composition of a non-azeotrope-like mixture changes to a substantial degree during boiling or evaporation. Azeotrope-like compositions include all ratios of the azeotropic components that boil within one °C. of the minimum boiling point at 760 Torr (101.1 kPa).

Azeotrope-like compositions of octamethyltrisiloxane and 2-butoxyethanol were found at 760 Torr (101.1 kPa) vapor pressure for all ratios of the components, where the weight percent 2-butoxyethanol varied between 5–33% and the weight percent octamethyltrisiloxane varied between 67–95%. These azeotrope-like compositions had a normal boiling point that was within one °C. of the minimum value of 149.9° C.

Azeotrope-like compositions of octamethyltrisiloxane and 2-methylcyclohexanol were found at 760 Torr (101.1 kPa) vapor pressure for all ratios of the components, where the weight percent 2-methylcyclohexanol varied between 5–35% and the weight percent octamethyltrisiloxane varied between 65–95%. These azeotrope-like compositions had a normal boiling point that was within one °C. of the minimum value of 150.2° C.

Azeotrope-like compositions of octamethyltrisiloxane and isopropyl lactate were found at 760 Torr (101.1 kPa) vapor pressure for all ratios of the components, where the weight percent isopropyl lactate varied between 21–64% and the weight percent octamethyltrisiloxane varied between 36–79%. These azeotrope-like compositions had a normal boiling point that was within one °C. of the minimum value of 143.3° C. The procedure used in determining the azeotrope-like compositions was the same as Example I. The azeotrope-like compositions were homogeneous and have the same utility as the azeotropes in Tables I–III.

One especially useful application of the azeotropes is cleaning and removing fluxes used in mounting and soldering electronic parts on printed circuit boards. A solder is often used in making a mechanical, electro-mechanical, or electronic connection. In making electronic connections, components are attached to the conductor paths of a printed wiring assembly by wave soldering. The solder is usually a tin-lead alloy combined with a rosin based flux. Rosin is a complex mixture of isomeric acids principally abietic acid. Rosin fluxes often contain activators such as amine hydrohalides and organic acids. The flux reacts with and removes surface compounds such as oxides. It reduces the surface tension of the molten solder alloy and prevents oxidation during the heating cycle by providing a surface blanket to the base metal and solder alloy. After the soldering operation, it is usually necessary to clean the assembly. The azeotropes of the invention are useful as the final cleaner. They remove any flux residues and oxides formed on areas unprotected by the flux during soldering which are corrosive or could cause malfunctioning or short circuiting of electronic assemblies. In this application, the azeotropes can be used as cold cleaners, vapor degreasers, or with ultrasonic energy. The azeotropes can also be used to remove carbonaceous materials from the surface of such articles, and from the surface of other industrial articles. By carbonaceous material is meant any carbon containing compound or mixtures of carbon containing compounds which are soluble in a common organic solvent such as hexane, toluene, or 1,1,1-trichloroethane.

Azeotropes were used for cleaning a rosin-based solder flux used as the soil. Cleaning tests were conducted at 22° C. in an open bath with no distillative recycle of the azeotrope. An azeotrope containing each alcohol, and two azeotropes containing the ester were tested. The azeotropes removed flux although they were not equally effective. The following example illustrates this aspect of the invention.

EXAMPLE II

A rosin flux was mixed with 0.05 weight percent of a nonreactive low viscosity silicone glycol flow-out additive. The mixture was applied as a uniform thin layer to a 2"×3" (5.1×7.6 cm) area of an Aluminum Q panel and spread out evenly with the edge of a spatula. An activated rosin-based solder flux (Kester No. 1544) commonly used for electrical and electronic assemblies was employed. This flux is available from Kester Solder Division, Litton Industries, Des Plaines, Ill. The approximate composition of the flux is 50 weight percent of modified rosin, 25 weight percent ethanol, 25 weight percent 2-butanol, and one weight percent of a proprietary activator. The coating was allowed to dry at room temperature and cured at 100° C. for ten minutes in an air oven. The panel was placed in a large beaker with a magnetic stirring bar at the bottom and one-third filled with the azeotrope. Cleaning was conducted while rapidly stirring at room temperature even when cleaning with the higher temperature azeotropes. The panel was removed at timed intervals, dried at room temperature, weighed, and re-immersed for additional cleaning. The initial coating weight and weight loss were measured as a function of cumulative cleaning time, and data is shown in Table IV.

In Table IV, 2-butoxyethanol is abbreviated "BUTOXY"; 2-methylcyclohexanol is abbreviated "2-M-C-H"; and isopropyl lactate is abbreviated "LACTATE". "WT %" refers to weight percent of the alcohols and ester. "TEMP" is the azeotropic temperature in °C. "WT" is the initial weight of the coating in grams. "Time" is cumulative time measured after the elapse of one, five, ten, and thirty minutes. Composition No. 5 is a CONTROL consisting of one hundred percent by weight octamethyltrisiloxane used for comparison. Table IV shows that the azeotropes 1–4 were more effective cleaners than CONTROL No. 5.

space hardware such as precision guidance equipment used in defense and aerospace industries. Water displacement fluids typically contain small amounts of one or more surfactants. By using VMS containing azeotropes as rinsing fluid, (i) residual surfactant on the part is more thoroughly removed; (ii) carry-over loss of rinse fluid is reduced; and (iii) the extent of water displacement is increased.

Cleaning can be conducted by using a given azeotrope at or near its azeotropic temperature or at some other temperature. The azeotrope alone can be used, or small amounts of one or more organic liquid additives can be combined with the azeotrope, such as compounds capable of imparting an enhanced oxidative stability, corrosion inhibition, or solvency enhancement. Oxidative stabilizers inhibit slow oxidation of organic compounds such as alcohols. Corrosion inhibitors inhibit metal corrosion by traces of acids that may be present or slowly form in alcohols. Solvency enhancers increase solvency power by adding a more powerful solvent to the starting solvent. Oxidative stabilizers are used in

TABLE IV

CLEANING EXTENT AT ROOM TEMPERATURE (22° C.)

| No. | WT % | LIQUIDS | TEMP | WT | % REMOVED (Time-min) | | | |
| --- | --- | --- | --- | --- | --- | --- | --- | --- |
| | | | | | 1 | 5 | 10 | 30 |
| 1 | 38% | LACTATE | 143.3 | 0.3292 | 87.9 | 100.0 | — | — |
| 2 | 21% | LACTATE | 25.0 | 0.3226 | 87.9 | 98.1 | 99.7 | — |
| 3 | 16% | 2-M-C-H | 150.2 | 0.3257 | 0.4 | 87.1 | 92.5 | 95.9 |
| 4 | 16% | BUTOXY | 149.9 | 0.3326 | 79.8 | 97.5 | 99.1 | 99.1 |
| 5 | 0% | 100% MDM | — | 0.3260 | 0.0 | 2.8 | 7.0 | 21.0 |

These azeotropes have several advantages for cleaning, rinsing, or drying. Thus, the azeotrope can easily be regenerated by distillation so that the performance of the cleaning mixture can be restored after periods of use. Performance factors affected by compositions of the azeotropes are bath life, cleaning speed, lack of flammability when one component is nonflammable, and lack of damage to sensitive parts. In vapor phase degreasing, the azeotropes can be continually restored by continuous distillation at atmospheric or reduced pressure and continually recycled in the cleaning equipment. In this equipment, cleaning or rinsing can be conducted at the boiling point by plunging the part into the boiling liquid, or allowing the refluxing vapor to condense on the cold part. Alternatively, the part can be immersed in a cooler bath continually fed by fresh condensate while dirty overflow liquid is returned to a sump. In the later case, the part is cleaned in a continually renewed liquid of maximum cleaning power.

If the azeotrope is used in an open system, its composition and performance will remain constant even though evaporative losses occur. Such a system can be operated at room temperature when used as an ambient cleaning bath or a wipe-on-by-hand cleaner. Cleaning baths can also be operated at elevated temperatures below the boiling point, since cleaning, rinsing, or drying often occurs faster at elevated temperatures, and is desirable when the part to be cleaned and equipment permit.

VMS containing azeotropes are beneficial when used to rinse water displacement fluids from mechanical and electrical parts such as gear boxes and electric motors, and articles made of metal, ceramic, glass, and plastic. Examples of such articles are electronic and semiconductor parts; precision parts such as ball bearings; optical parts such as lenses, photographic, and camera parts; and military and amounts of about 0.05–5% by weight. Corrosion inhibitors are used in amounts of about 0.1–5% by weight. Solvency enhancers are used in amounts of about 1–10% by weight.

These additives can mitigate undesired effects of alcohol components of the azeotrope since the alcohol is not as resistant to oxidative degradation as the VMS. Numerous additives are suitable for combination with the azeotropes and the VMS is miscible with small amounts of many such additives. However, the additive must be one in which the resulting liquid mixture of the additive and azeotrope is homogeneous and single phased.

Oxidative stabilizers that may be used are phenols such as trimethylphenol, cyclohexylphenol, thymol, 2,6-di-t-butyl-4-methylphenol, butylhydroxyanisole, and isoeugenol; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpiperidine, and N,N'-diallyl-p-phenylenediamine; and triazoles such as benzotriazole, 2-(2'-hydroxy-5'-methylphenyl)benzotriazole, and chlorobenzotriazole.

Corrosion inhibitors that may be used are aliphatic nitro compounds such as nitromethane, nitroethane, and nitropropane; acetylchic alcohols such as 3-methyl-1-butyn-3-ol, and 3-methyl-1-pentyn-3-ol; epoxides such as glycidol, methyl glycidyl ether, allyl glycidyl ether, phenyl glycidyl ether, 1,2-butylene oxide, cyclohexene oxide, and epichlorohydrin; ethers such as dimethoxymethane, 1,2-dimethoxyethane, 1,4-dioxane, and 1,3,5-trioxane; unsaturated hydrocarbons such as hexene, heptene, octene, 2,4,4-trimethyl-1-pentene, pentadiene, octadiene, cyclohexene, and cyclopentene; olefin based alcohols such as allyl alcohol, and 1-butene-3-ol; and acrylic acid esters such as methyl acrylate, ethyl acrylate, and butyl acrylate.

Solvency enhancers that may be used are hydrocarbons such as pentane, isopentane, hexane, isohexane, and heptane; nitroalkanes such as nitromethane, nitroethane, and nitropropane; amines such as diethylamine, triethylamine, isopropylamine, butylamine, and isobutylamine; alcohols such as methanol, ethanol, n-propyl alcohol, isopropyl alcohol, n-butanol, and isobutanol; ethers such as methyl Cellosolve®, tetrahydrofuran, and 1,4-dioxane; ketones such as acetone, methyl ethyl ketone, and methyl butyl ketone; and esters such as ethyl acetate, propyl acetate, and butyl acetate.

Other variations may be made in the compounds, compositions, and methods described without departing from the essential features of the invention. The forms of the invention described are exemplary and not limitations on the scope of the invention defined in the claims.

That which is claimed is:

1. A composition consisting essentially of an azeotrope selected from the group consisting of
   (i) about 82 to about 96 percent by weight octamethyltrisiloxane and about 4 to about 18 percent by weight 2-butoxyethanol wherein the composition is homogenous and azeotropic at a temperature within the range of 75 to 160 degrees Centigrade inclusive and wherein the composition has a vapor pressure of 1000 Torr at 160 degrees Centigrade when the composition consists essentially of 82 percent by weight octamethyltrisiloxane and 18 percent by weight 2-butoxyethanol and wherein the composition has a vapor pressure of 55.1 Torr at 75 degrees Centigrade when the composition consists essentially of 96 percent by weight octamethyltrisiloxane and 4 percent by weight 2-butoxyethanol;
   (ii) about 82 to about 97 percent by weight octamethyltrisiloxane and about 3 to about 18 percent by weight 2-methylcyclohexanol wherein the composition is homogenous and azeotropic at a temperature within the range of 75 to 160 degrees Centigrade inclusive and wherein the composition has a vapor pressure of 1000 Torr at 160 degrees Centigrade when the composition consists essentially of 82 percent by weight octamethyltrisiloxane and 18 percent by weight 2-methylcyclohexanol and wherein the composition has a vapor pressure of 55 Torr at 75 degrees Centigrade when the composition consists essentially of 97 percent by weight octamethyltrisiloxane and 3 percent by weight 2-methylcyclohexanol; and
   (iii) about 61 to about 86 percent by weight octamethyltrisiloxane and about 14 to about 39 percent by weight isopropyl lactate wherein the composition is homogenous and azeotropic at a temperature within the range of 0 to about 153 degrees Centigrade inclusive and wherein the composition has a vapor pressure of 1000 Torr at about 153 degrees Centigrade when the composition consists essentially of 61 percent by weight octamethyltrisiloxane and 39 percent by weight isopropyl lactate and wherein the composition has a vapor pressure of 0.68 Torr at 0 degrees Centigrade when the composition consists essentially of 86 percent by weight octamethyltrisiloxane and 14 percent by weight isopropyl lactate.

2. A composition according to claim 1 selected from the group consisting of 18 percent by weight of 2-butoxyethanol and 82 percent by weight of octamethyltrisiloxane; 16 percent by weight of 2-butoxyethanol and 84 percent by weight of octamethyltrisiloxane; 12 percent by weight of 2-butoxyethanol and 88 percent by weight of octamethyltrisiloxane; 7 percent by weight of 2-butoxyethanol and 93 percent by weight of octamethyltrisiloxane; and 4 percent by weight of 2-butoxyethanol and 96 percent by weight of octamethyltrisiloxane.

3. A composition according to claim 1 selected from the group consisting of 18 percent by weight of 2-methylcyclohexanol and 82 percent by weight of octamethyltrisiloxane; 16 percent by weight of 2-methylcyclohexand and 84 percent by weight of octamethyltrisiloxane; 11 percent by weight of 2 -methylcyclohexanol and 89 percent by weight of octamethyltrisiloxane; 7 percent by weight of 2-methylcyclohexanol and 93 percent by weight of octamethyltrisiloxane; and 3 percent by weight of 2 -methylcyclohexanol and 97 percent by weight of octamethyltrisiloxane.

4. A composition according to claim 1 selected from the group consisting of 39 percent by weight of isopropyl lactate and 61 percent by weight of octamethyltrisiloxane; 38 percent by weight of isopropyl lactate and 62 percent by weight of octamethyltrisiloxane; 37 percent by weight of isopropyl lactate and 63 percent by weight of octamethyltrisiloxane; 34 percent by weight of isopropyl lactate and 66 percent by weight of octamethyltrisiloxane; 30 percent by weight of isopropyl lactate and 70 percent by weight of octamethyltrisiloxane; 26 percent by weight of isopropyl lactate and 74 percent by weight of octamethyltrisiloxane; 21 percent by weight of isopropyl lactate and 79 percent by weight of octamethyltrisiloxane; and 14 percent by weight of isopropyl lactate and 86 percent by weight of octamethyltrisiloxane.

5. A method of cleaning, rinsing, or drying the surface of an article comprising applying to the surface a composition defined in claim 1.

6. A composition consisting essentially of an azeotrope-like composition selected from the group consisting of
   (i) 67 to 95 percent by weight octamethyltrisiloxane and 5 to 33 percent by weight 2-butoxyethanol wherein the composition is homogeneous and azeotrope-like at a temperature within one degree of 149.9° C. at 760 Torr;
   (ii) 65 to 95 percent by weight octamethyltrisiloxane and 5 to 35 percent by weight 2-methylcyclohexanol wherein the composition is homogeneous and azeotrope-like at a temperature within one degree of 150.2° C. at 760 Torr; and
   (iii) 36 to 79 percent by weight octamethyltrisiloxane and 21 to 64 percent by weight isopropyl lactate wherein the composition is homogeneous and azeotrope-like at a temperature within one degree of 143.3° C. at 760 Torr.

7. A method of cleaning, rinsing, or drying the surface of an article comprising applying to the surface a composition defined in claim 6.

* * * * *